(12) United States Patent
Basinger

(10) Patent No.: US 9,288,949 B1
(45) Date of Patent: Mar. 22, 2016

(54) GRUBBING APPARATUS

(71) Applicant: Jon E. Basinger, Elida, OH (US)

(72) Inventor: Jon E. Basinger, Elida, OH (US)

( * ) Notice: Subject to any disclaimer, the term of this patent is extended or adjusted under 35 U.S.C. 154(b) by 0 days.

(21) Appl. No.: 14/470,178

(22) Filed: Aug. 27, 2014

(51) Int. Cl.
*A01G 23/06* (2006.01)

(52) U.S. Cl.
CPC ..................... *A01G 23/06* (2013.01)

(58) Field of Classification Search
CPC ................. A01G 23/043; A01G 23/046
USPC ........ 37/301, 302, 406; 30/134; 144/34.5, 4.1
See application file for complete search history.

(56) References Cited

U.S. PATENT DOCUMENTS

| | | | | | |
|---|---|---|---|---|---|
| 3,078,602 | A | * | 2/1963 | Holopainen | A01G 23/043 111/101 |
| 3,540,501 | A | * | 11/1970 | Jonsson | A01G 23/089 144/34.5 |
| 3,623,245 | A | * | 11/1971 | Adams | A01G 23/046 111/101 |
| 3,835,901 | A | * | 9/1974 | Jonsson | A01G 23/091 144/24.12 |
| 3,851,686 | A | * | 12/1974 | Hultdin | A01G 23/08 144/334 |
| 4,106,537 | A | * | 8/1978 | Saikku | A01G 23/091 144/34.1 |
| 4,271,611 | A | * | 6/1981 | Paul | A01G 23/043 111/101 |
| 4,332,093 | A | * | 6/1982 | Berthollet | A01G 23/043 111/101 |
| 4,481,989 | A | * | 11/1984 | Peters | A01G 23/065 144/24.12 |
| 4,979,321 | A | * | 12/1990 | Hall | A01G 23/046 111/101 |
| 5,133,268 | A | * | 7/1992 | Delisle | A01G 23/043 37/302 |
| 5,473,828 | A | | 12/1995 | Kishi | |
| 5,613,537 | A | * | 3/1997 | Gassiott | A01G 23/067 144/218 |
| 5,678,332 | A | | 10/1997 | Hawkins | |
| 5,715,614 | A | * | 2/1998 | Ookuwa | A01G 23/046 172/689 |
| 5,842,427 | A | * | 12/1998 | Hunter | A01G 23/046 111/101 |
| 5,901,477 | A | | 5/1999 | Weaver | |
| 6,026,869 | A | * | 2/2000 | Holmes | A01G 23/081 144/336 |
| 6,453,957 | B1 | | 9/2002 | Devaney | |
| 6,561,108 | B2 | * | 5/2003 | Fisher | A01G 23/043 111/101 |
| 8,001,708 | B1 | | 8/2011 | Reed | |
| 8,474,159 | B2 | | 7/2013 | Molino | |
| 8,561,325 | B1 | | 10/2013 | Hegener et al. | |

OTHER PUBLICATIONS

PCT International Search Report, Application No. PCT/US2015/045836, dated Nov. 4, 2015.

* cited by examiner

*Primary Examiner* — Matthew D Troutman
(74) *Attorney, Agent, or Firm* — MacMillan, Sobanski & Todd, LLC

(57) ABSTRACT

An apparatus for removing trees and bushes from the ground includes a frame configured for attachment to a vehicle. A first device is attached to the frame and configured to grasp a tree or a bush. A second device is attached to the frame and configured to cut, below ground, roots of the tree or bush grasped by the first device.

18 Claims, 8 Drawing Sheets

GRUBBING APPARATUS

BACKGROUND OF THE INVENTION

This invention relates in general to a grubbing apparatus for removing trees, bushes, and other vegetation from the ground. In particular, this invention relates to an improved apparatus for removing trees, bushes, and other vegetation that is attachable to a wheeled or tracked construction apparatus or vehicle, such as a skid loader.

A conventional skid loader is a small rigid framed, engine-powered machine with lift arms used to attach a wide variety of labor-saving tools or attachments, many powered by the skid loader's hydraulic system. Wheeled skid loaders are typically four-wheel vehicles with the wheels mechanically locked in synchronization on each side, and the left-side drive wheels can be driven independently of the right-side drive wheels. Skid loaders may also be equipped with tracks in lieu of the wheels.

Grubbing attachments have been developed for attachment to skid loaders to clear land by removing bushes, trees, and other vegetation from land for agricultural, residential, commercial, and other uses. Known grubbing attachments are difficult to use. Known scoop and root cutting attachments are directly connected to, and moved by, the articulating arm of a skid loader. Removing trees with these known devices exerts an undesirably large amount of force on the skid loader and its articulating arm. It would be desirable therefore, to provide an improved apparatus for removing trees and bushes from the ground.

SUMMARY OF THE INVENTION

The present application describes various embodiments of an apparatus for removing trees and bushes from the ground. One embodiment of the apparatus for removing trees and bushes from the ground includes a frame configured for attachment to a vehicle. A first device is attached to the frame and configured to grasp a tree or a bush. A second device is attached to the frame and configured to cut, below ground, roots of the tree or bush grasped by the first device.

In another embodiment, an attachment for a skid loader includes a frame configured for attachment to the skid loader. A pincher is movably mounted to the frame and configured to grasp a tree or a bush. A scoop is movably mounted to the frame and configured to cut, below ground, roots of the tree or bush grasped by the pincher.

Other advantages of the apparatus for removing trees and bushes from the ground will become apparent to those skilled in the art from the following detailed description, when read in view of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

As used in the description of the invention and the appended claims, the word/phrase "grubbing" is defined as the removal of trees, shrubs, other vegetation, and stumps from land.

Figure 1:
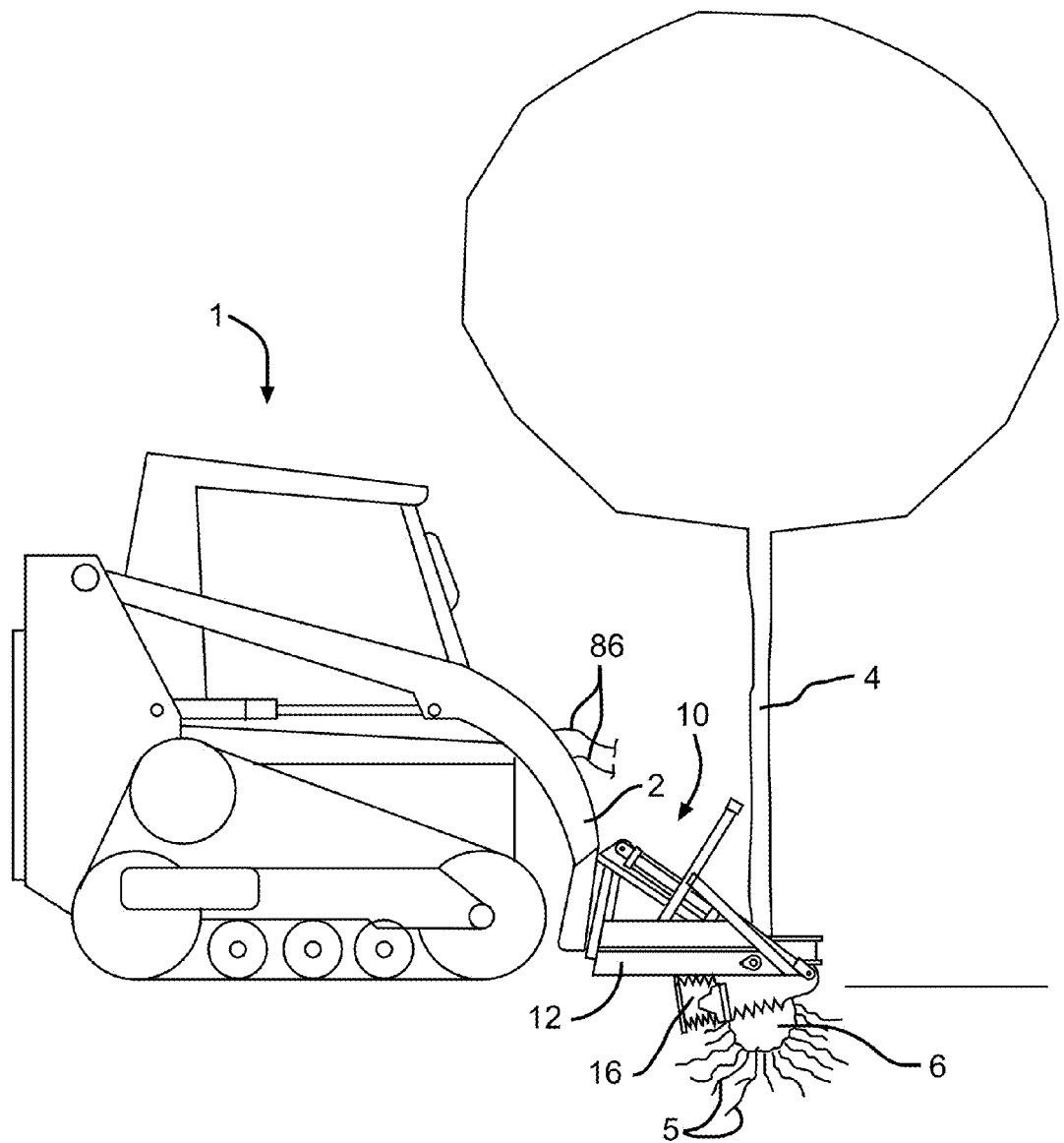
FIG. 1 is an elevational view of an improved grubbing apparatus in accordance with this invention, showing the scoop in a first position.
Figure 2:
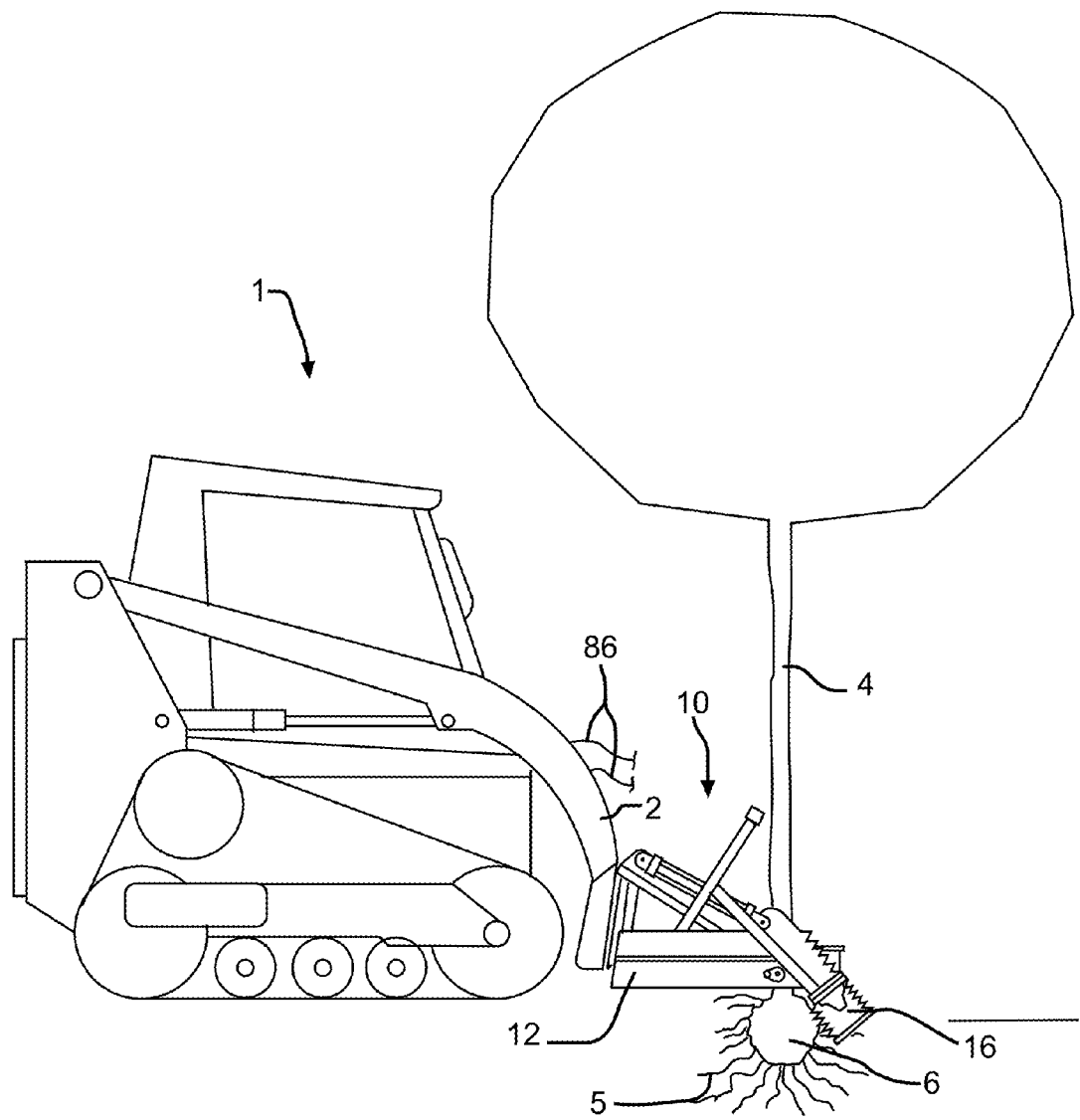
FIG. 2 is an elevational view of the improved grubbing apparatus illustrated in FIG. 1, showing the scoop in a second position.

Referring now to the drawings, there is illustrated in FIGS. 1 and 2 an improved grubbing apparatus 10, shown attached to a skid loader 1. The skid loader 1, to the extent shown, is representative of a conventional structure for a skid loader used, for example in construction, farming, landscaping, and the like.

The embodiments of the grubbing apparatus described and illustrated herein are sized and configured for attachment to, and use with, a skid loader for use in the removal of trees up to about 10 inches in diameter. It will be understood however, that the grubbing apparatus 10 may be manufactured in a larger size for attachment to larger vehicles, such as for example a conventional front end loader, for use in the removal of trees larger than about 10 inches in diameter.

The grubbing apparatus 10 may also be manufactured in a smaller size for attachment to smaller vehicles, such as for example a conventional walk behind loader, for use in the removal of trees smaller than about 4 inches in diameter, and in small spaces, such as a residential yard.

Referring again to FIGS. 1 and 2, the improved grubbing apparatus 10 illustrated therein is configured for attachment to an articulating arm 2 of the skid loader 1. The skid loader 1 shown in FIGS. 1 and 2 is a tracked skid loader, however the invention may also be used with an alternative embodiment of the skid loader, such as a conventional wheeled skid loader, and other construction vehicles.

The illustrated grubbing apparatus 10 includes a frame 12 selectively attachable and detachable to a vehicle. In the exemplary embodiment of the grubbing apparatus 10 illustrated in FIGS. 1 through 8, the grubbing apparatus 10 is selectively attachable and detachable to the skid loader 1.

Figure 8:
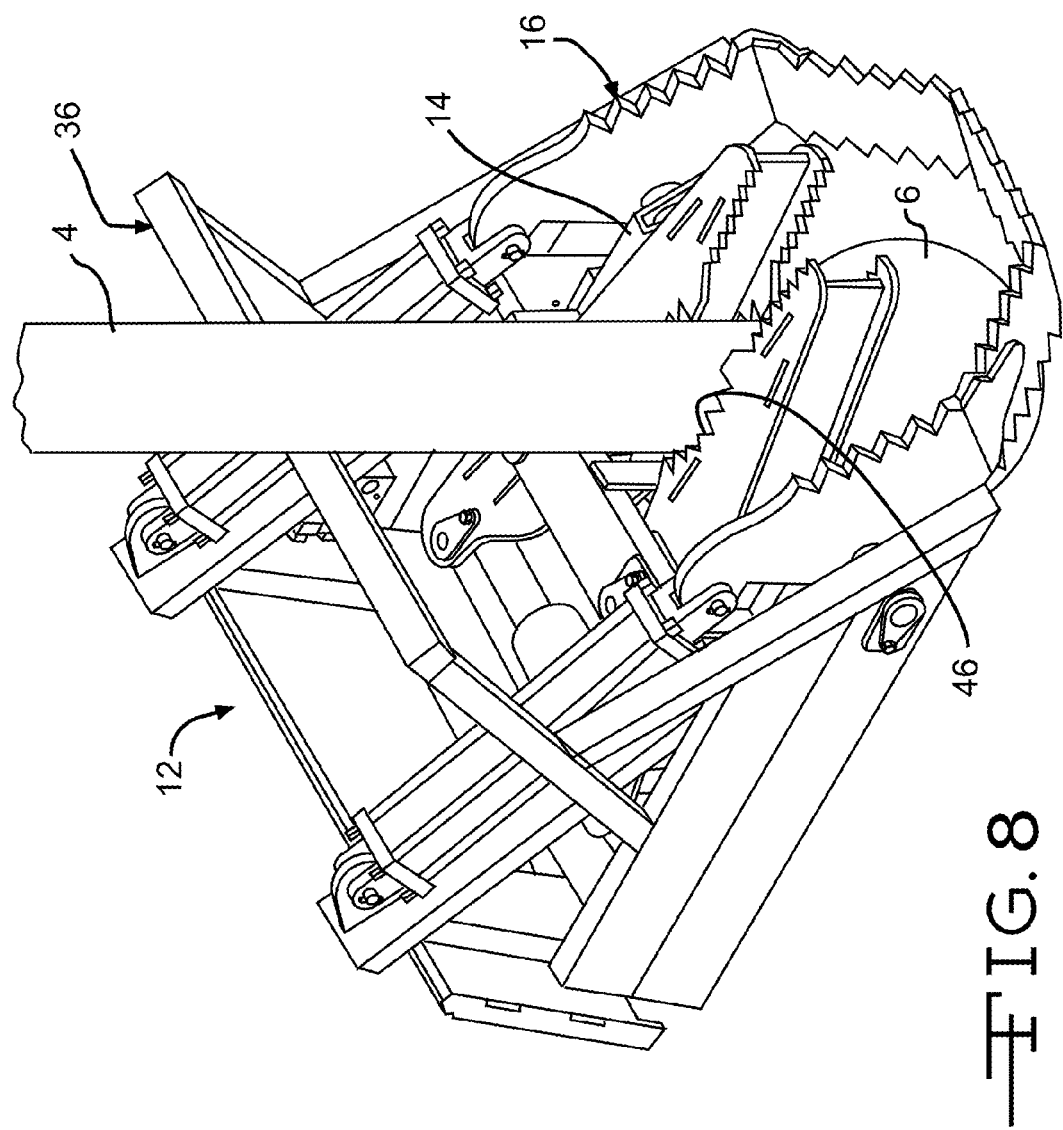
FIG. 8 is an enlarged perspective view of the improved grubbing apparatus illustrated in FIGS. 1 and 2, showing the pincher closed about a tree and the scoop in the second position.

As best shown in FIG. 8, a first device or pincher 14 is pivotally attached to the frame 12 and configured to grasp a tree, a bush, or other vegetation, such as the tree 4 illustrated in FIGS. 1, 2 and 8. A second device or scoop 16 is also pivotally attached to the frame 12 and configured to dig into the earth and cut, below ground, roots of the tree, bush, or other vegetation grasped by the pincher 14. Once the roots 5 are cut, the grubbing apparatus 10 is configured to lift and carry a tree 4 and its attached root ball 6; i.e., the cut roots 5 of the tree 4 and the soil attached to the roots 5. Although the grubbing apparatus 10 is shown grasping at tree 4, it will be understood that the grubbing apparatus 10 may be used to grasp remove a bush or other vegetation, not shown.

Figure 3:
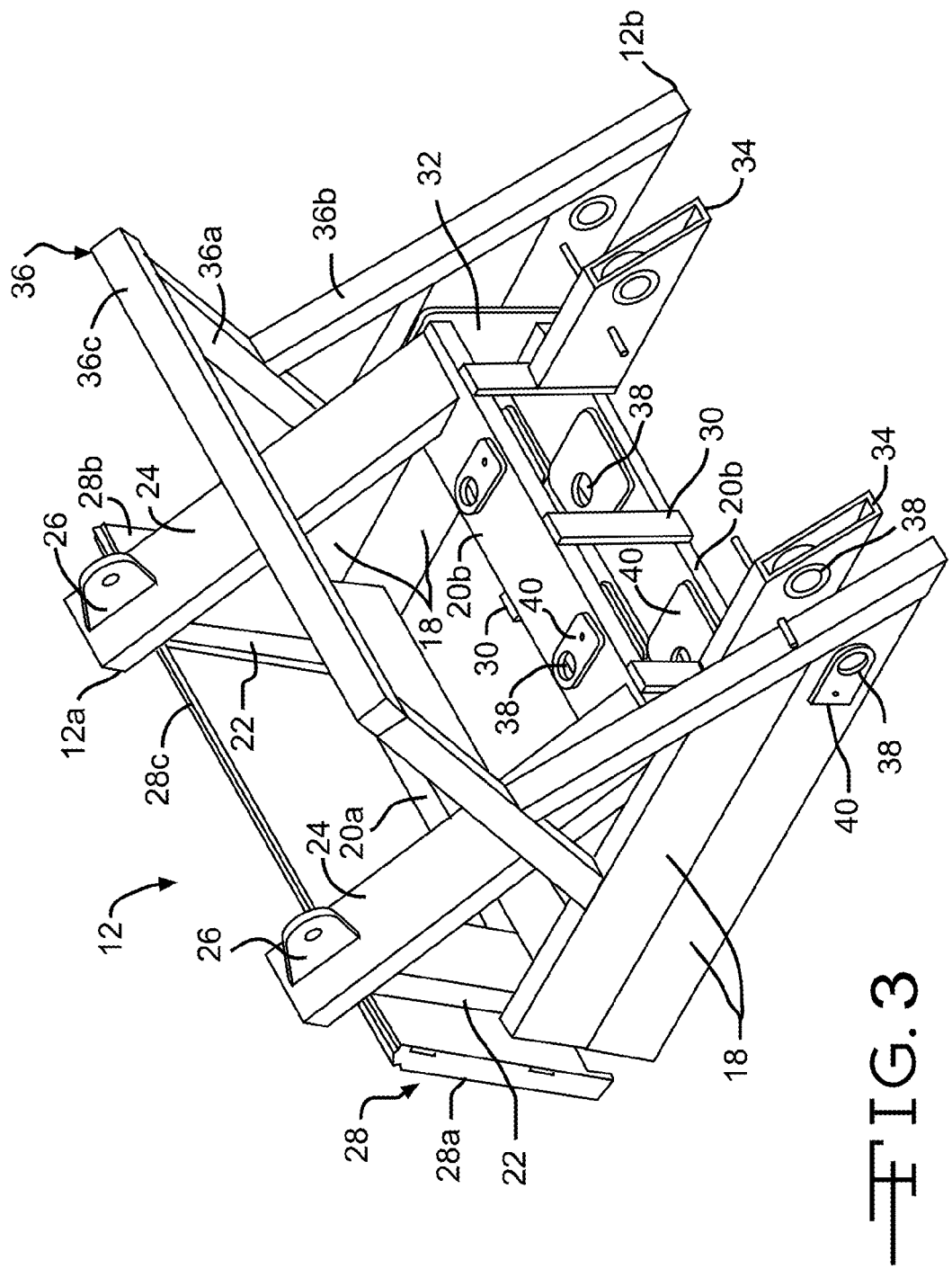
FIG. 3 is an enlarged perspective view of the frame illustrated in FIGS. 1 and 2.

The structure of the frame 12 is illustrated in detail in FIG. 3, and is shown with the pincher 14 and scoop 16 removed for clarity. As shown therein, the frame 12 includes a first end 12a, configured for attachment to the skid loader 1, and a second end 12b opposite the first end 12a. The frame 12 is formed from a plurality of side members 18 connected by rear and forward cross members 20a and 20b, respectively. Upright members 22 extend outwardly and upwardly (when viewing FIG. 3) from the rear cross member 20a. Connecting members 24 extend between the upright members 22 and an uppermost one of the forward cross members 20b. A mounting flange 26 extends outwardly from each connecting member 24 at a first end thereof. A mounting plate 28 is also attached to the first end 12a of the frame 12 and includes a first side member 28a, a second side member 28b and a cross member 28c extending between the first and second side members 28a and 28b, and is configured for attachment to the articulating arm 2 of the skid loader 1.

Connecting plates 30 extend between the forward cross members 20a and 20b. In the exemplary embodiment illustrated, end plates 32 are attached to the distal ends of the forward cross members 20a and 20b, and also attached to the side members 18. Scoop attachment members 34 are attached to connecting plates 30 and extend outwardly toward the second end 12b of the frame 12.

A tree guard 36 is attached to the frame 12 and includes a pair of first, forward and upwardly extending legs 36a attached to an uppermost one of the side members 18. A pair of second, forward and downwardly extending legs 36b is attached to the first legs 36a and the side members 18. A cross member 36c extends between the pair of first legs 36a and defines a tree engagement surface. Pivot pin apertures 38 are formed in the side members 18, the forward cross members 20b, and the scoop attachment members 34. Bushings 40 may be attached to the side members 18, the forward cross members 20b, and the scoop attachment members 34 about the apertures 38.

In the illustrated embodiment, the side members 18, the cross members 20a and 20b, the scoop attachment members 34, the upright members 22, the connecting members 24, and the tree guard 36 are formed from rectangular steel tube having a wall thickness of about 5/16 inch. Alternatively, the tree guard 36 may be formed from rectangular steel tube having a wall thickness within the range of from about 1/4 inch to about 3/8 inch. Other components of the frame 12, including the mounting plate 28, the connecting plates 30, and the end plates 32 may be formed from steel, such as plate steel having a thickness of about 1/4 inch, and welded together. Alternatively, these components 36 may be formed from plate steel having a wall thickness within the range of from about 1/4 inch to about 3/8 inch, and may be formed from other desired metal, metal alloys, and non-metal material.

In the embodiment of the grubbing apparatus 10 illustrated, the mounting plate 28 of the frame 12 is attached to an articulating arm 2 of the skid loader 1. The mounting plate 28 may be attached to the articulating arm 2 with any desired fasteners, such as threaded fasteners or quick connectors.

Figure 4:
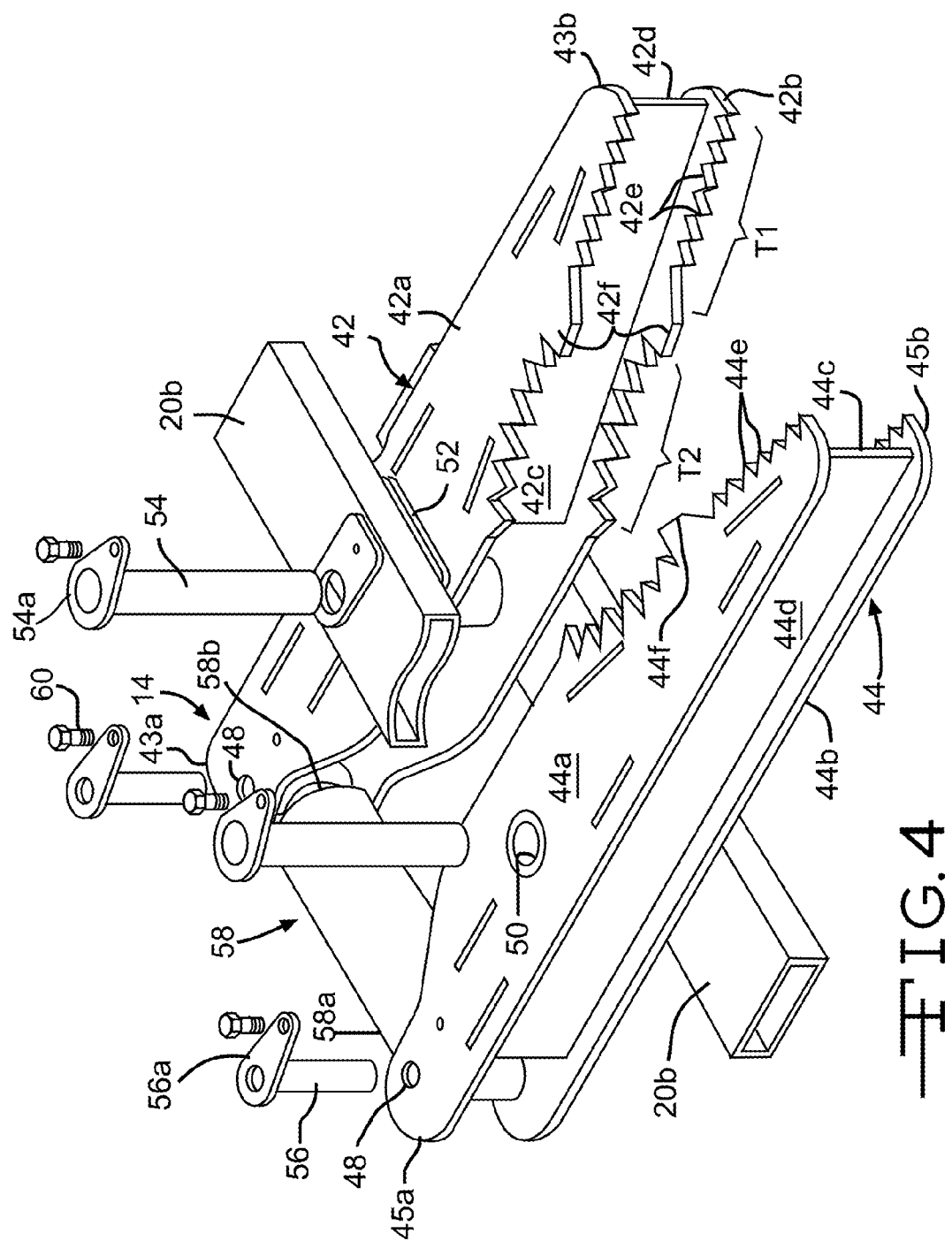
FIG. 4 is an enlarged perspective view of the pincher illustrated in FIGS. 1 and 2 showing the pincher in an open position.
Figure 5:
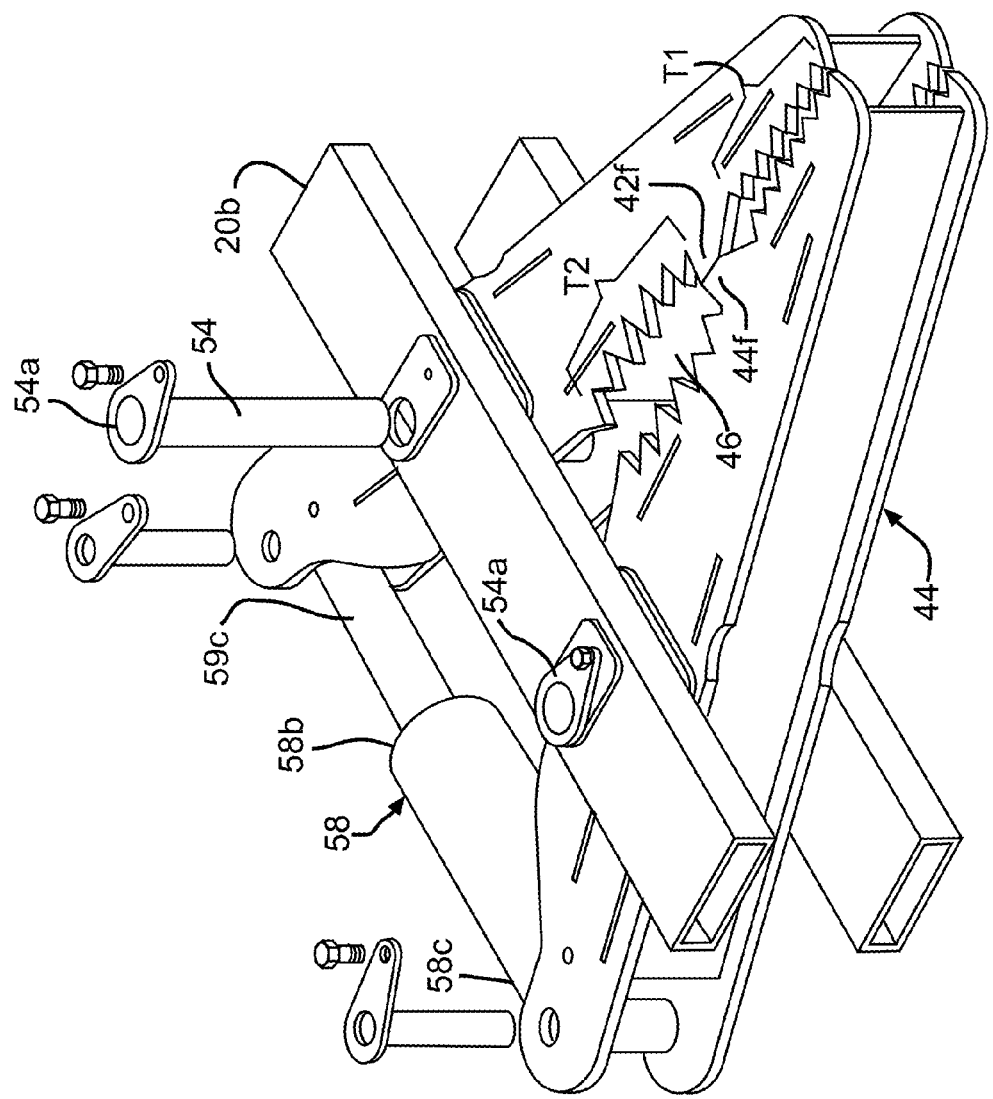
FIG. 5 is an enlarged perspective view of the pincher illustrated in FIGS. 1 and 2 showing the pincher in a closed position.

The structure of the pincher 14 is illustrated in detail in FIGS. 4 and 5. As shown therein, the pincher 14 includes a pair of arms 42 and 44 pivotally attached to the forward cross members 20b. The arm 42 has a first end 43a, configured for attachment to the first end 12a of the frame 12, and a second end 43b opposite the first end 43a, and includes substantially parallel first and second toothed members 42a and 42b. The first and second toothed members 42a and 42b are connected by connecting members 42c and 42d. Each of the toothed members 42a and 42b has a plurality of teeth 42e formed on inwardly facing edge surfaces thereof, the teeth 42e defining serrated edge surfaces.

In the illustrated embodiment, the arms 42 and 44 have two groups of teeth T1 and T2 separated by engagement members 42f and 44f, respectively. The first group of teeth T1 has a substantially straight profile and is formed a forward end of the arm 42. A second group of teeth T2 has a substantially curved profile, and defines a space 46 between the opposing second groups of teeth T2 in the arms 42 and 44 when the pincher 14 is in a closed position, as shown in FIG. 5.

The arm 44 has a first end 45a, configured for attachment to the first end 12a of the frame 12, and a second end 45b opposite the first end 43a, and is an identical, but mirror image of the arm 42. Therefore, the component parts 44a through 44f of the arm 44 are identical to the corresponding parts 42a through 42f of the arm 42, and will not be described in detail.

First and second pivot pin apertures 48 and 50 are formed in the arms 42 and 44. Bushings 52 may be attached to the arms 42 and 44 between the arms 42 and 44 and the forward cross members 20b about the apertures 50. Pivot pins 54 are inserted through the pivot pin apertures 38 in the forward cross members 20b and the second pin apertures 50 in the arms 42 and 44 to pivotally attach the arms 42 and 44 to the forward cross members 20b. Pivot pins 56 are inserted through the first pin apertures 48 in the arms 42 and 44 to pivotally attach the arms 42 and 44 to distal ends of a force generating apparatus. In the illustrated embodiment, the force generating apparatus in a hydraulic jack 58. The pivot pins 54 and 56 may be secured to the arms 42 and 44 by fasteners, such as threaded fasteners 60, that extend through mounting flanges 54a and 56a at an upper end (when viewing FIGS. 4 and 5) of the pivot pins 54 and 56, respectively.

The hydraulic jack 58 has a first end 58a and a second end 58b. A piston rod 58c extends outwardly from the second end 58b. The first end 58a of the hydraulic jack is configured for pivotal mounting about the pivot pin 56 at a first end of the arm 44. A distal end of the piston rod 58c is configured for pivotal mounting about the pivot pin 56 at a first end of the arm 42.

In the illustrated embodiment, the pincher 14 is formed from steel, such as plate steel having a thickness of about 1/2 inch, and the component toothed members 42a and 42b and connecting members 42d and 42e are welded together. Alternatively, the pincher 14 may be formed from plate steel having a wall thickness within the range of from about 3/8 inch to about 1 inch.

Similarly, the component toothed members 44a and 44b and connecting members 44d and 44e are welded together. Alternatively, the component members 42a, 42b, 42c, 42d, 44a, 44b, 44c, and 44d may be formed from other desired metal, metal alloys, and non-metal material.

Figure 6:
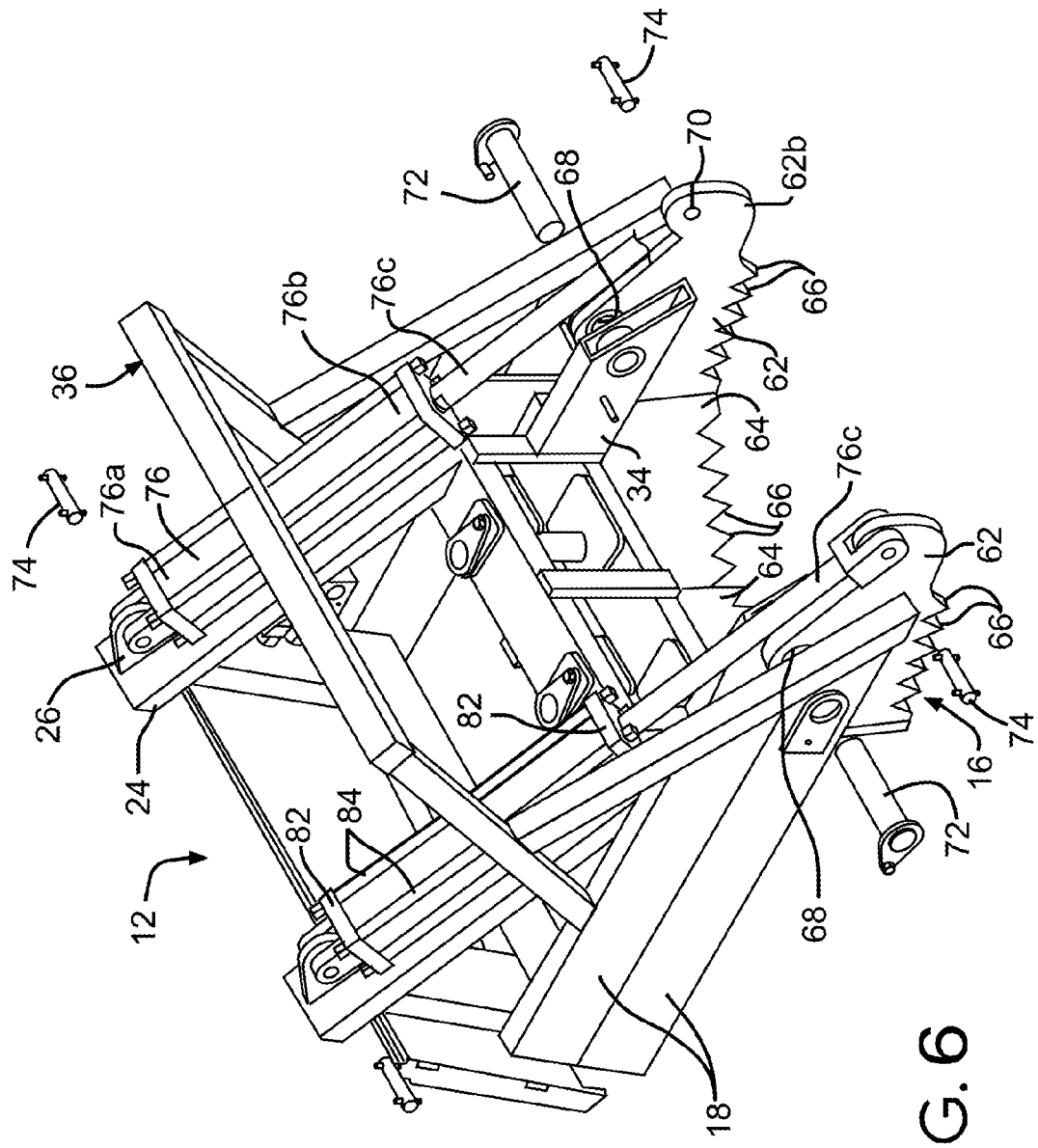
FIG. 6 is an enlarged perspective view of the frame and scoop illustrated in FIGS. 1 and 2 showing the scoop in the first position.
Figure 7:
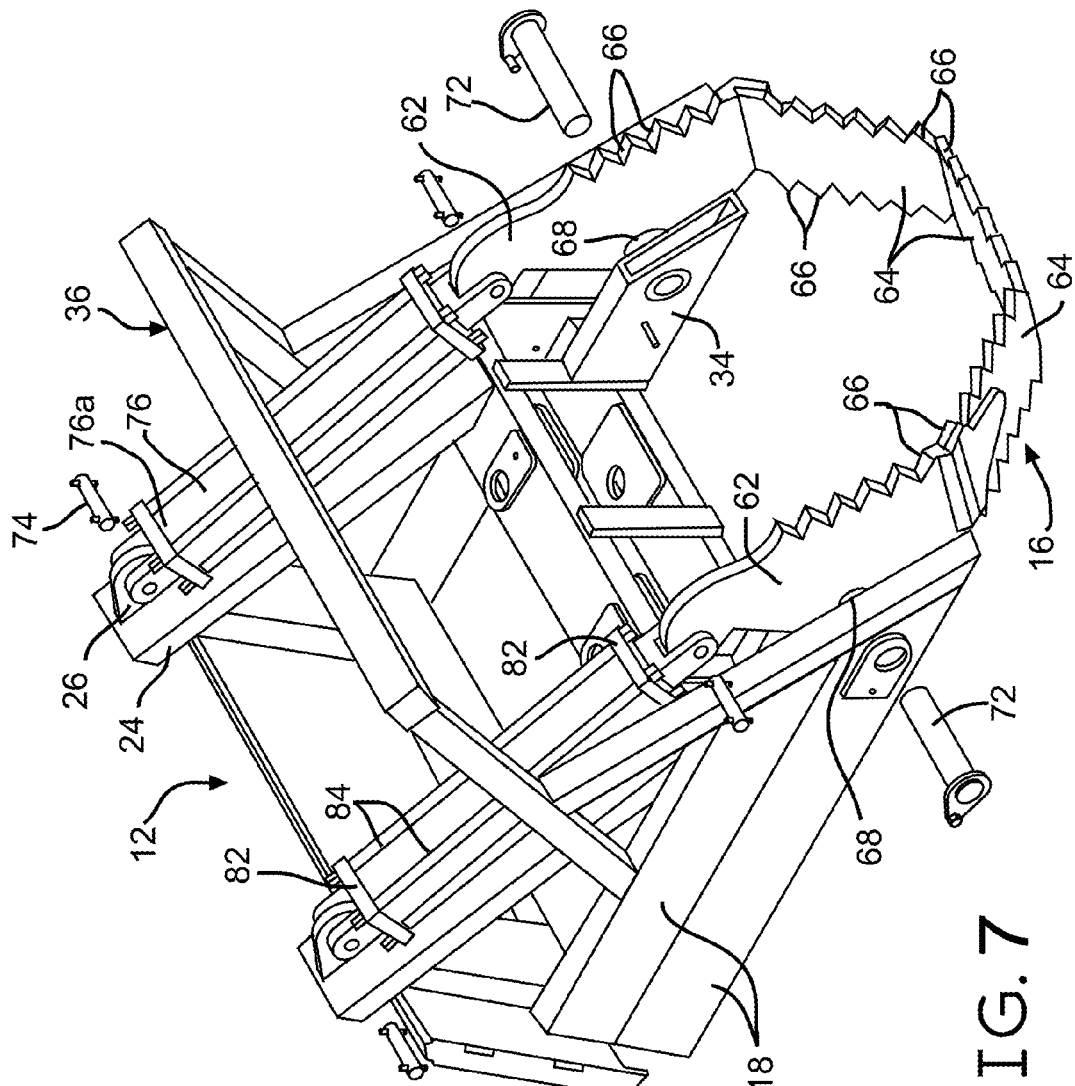
FIG. 7 is an enlarged perspective view of the frame and scoop illustrated in FIGS. 1 and 2 showing the scoop in the second position.

The structure of the scoop 16 is illustrated in detail in FIGS. 6 and 7. As shown therein, the scoop 16 is pivotally attached to the side members 18 and the scoop attachment members 34. The illustrated scoop 16 includes two substantially parallel side walls 62 and three forward walls 64. Each wall 62 and 64 is substantially flat and has a plurality of serrated teeth 66 formed on opposing peripheral edge surfaces thereof.

First and second pivot pin apertures 68 and 70 are formed in the side walls 62, and the side walls 62 are positioned between the side members 18 and the scoop attachment members 34. Pivot pins 72 are inserted through the pivot pin apertures 38 in the side members 18 and the scoop attachment members 34, and the pivot pin apertures 68 in the side walls 62 to pivotally attach the scoop 16 to the frame 12.

Pivot pins 74 pivotally attach a first end 76a of a hydraulic jack 76 to the mounting flange 26 of each connecting member 24. A piston rod 76c extends outwardly from a second end 76b of the hydraulic jack 76, and a distal end of the piston rod 76c is configured for pivotal mounting about the pivot pins 74 in the second pivot pin apertures 70.

In the illustrated embodiment, the hydraulic jack 76 is mounted to the frame 12 within a jack mount 80. The jack mount 80 includes end plates 82 connected by a plurality of longitudinally extending members or rods 84.

In operation, the grubbing apparatus 10 is mounted to the skid loader 1 and employed to remove a tree, bush, or other vegetation. Hydraulic conduits 86, portions of which are shown in FIGS. 1 and 2, may be provided to fluidly connect the hydraulic jacks 58 and 76 to a source of pressurized hydraulic fluid within the skid loader 1.

The means to control the hydraulic fluid within the skid loader 1 may include a hydraulic flow diverter having an electric solenoid valve. Such a hydraulic flow diverter allows the skid loader operator, upon actuation of a switch within a cab of the skid loader, to selectively operate one or both of the pincher 14 and the scoop 16. Additionally, the skid loader may include flow dividers plumbed into the skid loader's hydraulic system such that each flow divider is operable to control one of the two hydraulic jacks 76 attached to the scoop 16. The flow dividers ensure that each of the two hydraulic jacks 76 operate simultaneously when in operation.

The pincher 14 may be moved between an open position as shown in FIG. 4 and a closed position as shown in FIG. 5 by selective actuation of the hydraulic jack 58. In the open position, the piston rod 58c is retracted within the hydraulic jack 58. To move the pincher 14 to a partially or fully closed position, an operator supplies hydraulic pressure from the skid loader 1 to the hydraulic jack 58 to extend the piston rod 58c outwardly, thereby moving the first ends 43a and 45a of the arms 42 and 44, respectively, away from each other and moving the first ends 43b and 45b closer together. As shown in FIG. 5, when the pincher 14 is in the fully closed position, the engagement members 42f and 44f are in contact with each other, and a space 46 is defined between the opposing second groups of teeth T2 in the arms 42 and 44.

The scoop 16 may be moved between a first position, as shown in FIGS. 1 and 6, wherein the forward walls 64 of the scoop 16 are closest to the first end 12a of the frame 12, and a second position, as shown in FIGS. 2 and 7, wherein the forward walls 64 of the scoop 16 are closest to the second end 12b of the frame 12 by selective actuation of the hydraulic jacks 76. In the first position, the piston rods 78 of the hydraulic jacks 76 are extended outwardly toward the second end 12b of the frame 12. To move the scoop 16 to the second position, an operator supplies hydraulic pressure from the skid loader 1 to the hydraulic jacks 76 to retract the piston rods 78 inwardly, thereby moving second ends 62b of the sidewalls 62 toward the first end 12a of the frame 12 and causing the scoop 16 to pivot about the pivot pins 72.

Although the pincher 14 and the scoop 16 have been described as being operated by hydraulic jacks, they may alternatively be operated by other means, such as for example an electric motor, a gas or diesel powered engine, or pneumatic jacks.

Operation of the grubbing apparatus 10 to remove the tree 4 as shown in FIGS. 1 and 2 will now be described. It will be understood that the grubbing apparatus 10 may also be used in a similar manner to remove bushes and other vegetation. For purposes of this example, the tree 4 may be any tree having a trunk up to about 10 inches in diameter. To begin the process of removing the tree 4, the skid loader operator may move the skid loader 1 to a location such that the grubbing apparatus 10 is near the tree 4.

With the frame 12 about six inches above the ground, the pincher 14 in the open position and the scoop 16 in the first position, the skid loader operator may drive the skid loader 1 toward the tree 4 until the tree 4 is positioned between the teeth T2 of the arms 42 and 44. Using the articulating arm 2 of the skid loader 1, the skid loader operator may then work the scoop 16 into the ground, thus urging the frame 12 into contact with, or very near, the ground. The skid loader operator may then extend the piston rod 58c of the hydraulic jack 58, thereby closing the pincher 14 about the trunk of the tree 4. At this point in the operation of the grubbing apparatus 10, the trunk of the tree 4 is firmly grasped by the pincher 14, the scoop 16 is partially embedded in the ground, and the frame 12 is near, or in contact with, the ground. The tree 4 is thus securely held by the grubbing apparatus 10 both horizontally, i.e., in a direction substantially parallel with the ground, and vertically, i.e., in a direction substantially perpendicular with the ground.

The skid loader operator may then begin the process of digging into the ground to cut the roots 5 of the tree 4. The skid loader operator may retract the piston rods 78 of the hydraulic jacks 76, thereby moving the scoop 16 from the first position, as shown in FIG. 1, to the second position, as shown in FIGS. 2 and 8. During pivotal movement of the scoop 16, the side walls 62 and the forward walls 64 are driven into the ground and below or through the roots 5 of the tree 4, thereby cutting the roots 5 and defining a root ball 6. As the scoop 16 is being driven into the ground, the frame is urged toward the ground (downward when viewing FIG. 2) and into contact with the ground. Once the scoop 16 is in the second position, as shown in FIG. 2, the skid loader operator may then extend the piston rods 78 of the hydraulic jacks 76, thus returning the scoop 16 to the first position. The skid loader operator may then raise the frame 12 upwardly, until the tree 4, grasped by the pincher 14, and its root ball 6 is above ground level. As described above, flow dividers within the skid loader's hydraulic system are operable to control the two hydraulic jacks 76 attached to the scoop 16, and ensure that each of the two hydraulic jacks 76 operate simultaneously when in operation.

Advantageously, the forces exerted by the scoop 16 as it digs into the ground are largely transferred to the frame 12 and back into the ground, thus significantly reducing stress on the articulating arm 2 of the skid loader 1, as is typically experienced in conventional grubbing and digging attachments that are directly attached to the articulation arm of a skid loader.

Lifting the tree 4 upward may cause the tree trunk to move slightly forwardly or rearwardly from a vertical orientation. It will be appreciated that the tree engagement surface 36c of the tree guard 36 prevents the trunk of the tree 4 from moving rearwardly beyond the tree engagement surface 36c, thereby protecting the grubbing apparatus 10 and the skid loader 1 from damage.

Advantageously, the tree 4 may be moved to any desired location with its trunk substantially vertical, allowing for ease of movement, especially in environments where there are many other trees.

Trees with trunks having a diameter of about four inches and smaller may be grasped by the pincher 14 as described above, either between the teeth T1 or T2. Once firmly grasped by the pincher 14, such a tree may be pulled from the ground by the skid loader operator by generally upward movement of the frame 12, and without use of the scoop 16. Additionally, Trees with trunks having a diameter of about two inches and smaller may be removed with the scoop 16 and without use of the pincher 14. For example, the skid loader operator may dig under such a small diameter tree with the scoop 16, remove the tree from the ground, and move the tree to a desired location, as described above.

The principle and mode of operation of the apparatus for removing trees and bushes from the ground have been described in its preferred embodiments. However, it should be noted that the apparatus for removing trees and bushes from the ground described herein may be practiced otherwise than as specifically illustrated and described without departing from its scope.

What is claimed is:

1. An apparatus for removing trees and bushes from the ground, the apparatus comprising:
    a frame configured for attachment to a vehicle;
    a pincher attached to the frame and comprising two arms, each arm having a first end and a second end and pivotally attached to the frame intermediate the first end and the second end, wherein each of the two arms includes serrated edge surfaces facing each other at the first ends thereof, wherein the pincher is movable between an open position wherein the serrated edge surfaces of the arms are spaced apart, and a closed position wherein the serrated edge surfaces of the arms are one of close to and in contact with each other, and wherein the pincer is configured to grasp a tree or a bush;
    a single force generating apparatus mounted between the second ends of the two arms and configured for moving the pincher between an open and a closed position; and
    a scoop attached to the frame and configured to cut, below and through the ground, roots of the tree or bush grasped by the first device, thereby defining a root ball.

2. The apparatus according to claim 1, wherein the vehicle is a skid loader.

3. The apparatus according to claim 1, wherein the vehicle is one of a front end loader and a walk behind loader.

4. The apparatus according to claim 1, wherein the pincher and the scoop are hydraulically operated, and wherein the vehicle includes a source of hydraulic pressure for operation the pincher and the scoop.

5. The apparatus according to claim 4, further including a flow diverter configured to allow a vehicle operator to operate a selected one of the pincher and the scoop.

6. The apparatus according to claim 1, wherein the force generating apparatus is a hydraulic jack pivotally connected to the frame.

7. The apparatus according to claim 1, wherein the scoop is pivotally attached to the frame about a pivot axis that is substantially parallel with the ground.

8. The apparatus according to claim 7, wherein the scoop includes a forward wall extending between two side walls, each side wall having a first end and a second end, each of the forward and side walls having a plurality of serrated teeth formed on opposing peripheral edge surfaces thereof, wherein each side wall is pivotally attached to the frame intermediate the first end and the second end thereof, and wherein the first ends of the side walls are each attached to a force generating apparatus configured for moving the scoop between a first position and a second position.

9. The apparatus according to claim 8, wherein the force generating apparatus is a hydraulic jack pivotally connected to the frame.

10. The apparatus according to claim 9, further including a flow divider operatively connected to each of the hydraulic jacks and operable to ensure that each of the hydraulic jacks operate simultaneously during operation of the scoop between the first and second positions.

11. The apparatus according to claim 8, wherein the forward wall includes a plurality of wall portions, each wall portion being substantially flat and attached to an adjacent wall portion at an obtuse angle.

12. The apparatus according to claim 8, wherein in the first position the pincher is in the open position and positioned such that a trunk of the tree or the bush in positioned between the arms of the pincher, and a first side edge of the scoop is positioned one of at and near the ground such that the forward wall is between the vehicle and the scoop pivot axis, and a ground facing portion of the frame is positioned one of in contact with and near the ground, and wherein in the second position a second side edge of the scoop is positioned one of partially within the ground and near the ground such that the scoop pivot axis is between the vehicle and the forward wall.

13. The apparatus according to claim 12, wherein the scoop is configured to be moved from the first position to a first intermediate position wherein the pincher is closed about the trunk of the tree or the bush, and wherein upon movement of the frame into contact with the ground, the first side edge of the scoop is caused to dig into the ground, the position of the frame in contact with ground thereby allowing forces exerted by the scoop as it digs into the ground to be transferred to the frame and into the ground.

14. The apparatus according to claim 1, further including a tree guard extending outwardly from the frame and including a cross member configured to engage the tree grasped by the pincher so as to prevent movement of the tree grasped by the pincher toward the apparatus and the vehicle to which the apparatus is attached.

15. The apparatus according to claim 1, wherein the frame has a first end configured for attachment to the vehicle and a second end, and includes at least two side members extending between the first and second ends and connected at their respective first ends by a first cross member and at their respective second ends by a second cross member, at least two upright members having first and second ends and extending outwardly and upwardly from the first cross member such that the first ends of the upright members are attached to the first cross member, and a connecting member extending between the second ends of each upright member and the second cross member.

16. The apparatus according to claim 15, wherein the frame further includes a mounting plate attached to the first end thereof, the mounting plate configured for attachment to the vehicle.

17. The apparatus according to claim 16, wherein the mounting plate configured for attachment to an articulating arm the vehicle.

18. An apparatus for removing trees and bushes from the ground, the apparatus comprising:
    a frame configured for attachment to a vehicle;

a pincher attached to the frame and comprising two arms, each arm having a first end and a second end and pivotally attached to the frame intermediate the first end and the second end, wherein each of the two arms includes serrated edge surfaces facing each other at the first ends thereof, the pincher configured to grasp a tree or a bush;

a single force generating apparatus mounted between the second ends of the two arms and configured for moving the pincher between an open and a closed position; and a scoop attached to the frame and configured to cut, below and through the ground, roots of the tree or bush grasped by the first device, thereby defining a root ball;

wherein the scoop includes a forward wall extending between two side walls, each side wall having a first end and a second end, each of the forward and side walls having a plurality of serrated teeth formed on opposing peripheral edge surfaces thereof, wherein the forward wall includes a plurality of wall portions, each wall portion being substantially flat and attached to an adjacent wall portion at an obtuse angle, wherein each side wall is pivotally attached to the frame intermediate the first end and the second end thereof, and wherein the first ends of the side walls are each attached to a force generating apparatus configured for moving the scoop between a first position and a second position.

* * * * *